(12) United States Patent
Hagg et al.

(10) Patent No.: US 7,947,114 B2
(45) Date of Patent: May 24, 2011

(54) CARBON MEMBRANES

(75) Inventors: May-Britt Hagg, Trondheim (NO); Jon Arvid Lie, Trondheim (NO)

(73) Assignee: NTNU Technology Transfer AS, Trondheim (NO)

( * ) Notice: Subject to any disclaimer, the term of this patent is extended or adjusted under 35 U.S.C. 154(b) by 548 days.

(21) Appl. No.: 11/989,957

(22) PCT Filed: Aug. 4, 2006

(86) PCT No.: PCT/GB2006/002926
§ 371 (c)(1),
(2), (4) Date: Apr. 30, 2008

(87) PCT Pub. No.: WO2007/017650
PCT Pub. Date: Feb. 15, 2007

(65) Prior Publication Data
US 2010/0162887 A1 Jul. 1, 2010

(30) Foreign Application Priority Data
Aug. 5, 2005 (GB) .................................. 0516154.2

(51) Int. Cl.
*B01D 53/22* (2006.01)
(52) U.S. Cl. ............... 95/51; 95/45; 95/55; 96/4; 96/11; 55/282.2; 55/DIG. 5; 423/447.2; 423/447.4; 423/447.8; 423/447.9; 502/56; 502/426

(58) Field of Classification Search .................. 96/4, 11, 96/108; 95/45, 51, 55, 90, 900, 901, 903; 55/282.2, 283.3, 283, DIG. 5, DIG. 10; 423/445 R, 423/447.1, 447.2, 447.4, 447.9, 447.8; 502/20, 502/56, 423, 426, 437
See application file for complete search history.

(56) References Cited

U.S. PATENT DOCUMENTS

| | | | |
|---|---|---|---|
| 4,670,300 A | 6/1987 | Stewart, Jr. | |
| 4,685,940 A | 8/1987 | Soffer et al. | |
| 4,737,421 A | 4/1988 | Uemura et al. | |
| 4,738,872 A | 4/1988 | Lee et al. | |
| 4,742,040 A | 5/1988 | Ohsaki et al. | |
| 5,102,855 A * | 4/1992 | Greinke et al. | 502/426 |
| 5,240,474 A | 8/1993 | Auvil et al. | |
| 5,925,591 A * | 7/1999 | Soffer et al. | 502/426 |
| 6,427,944 B1 | 8/2002 | Passman | |
| 6,589,904 B1 * | 7/2003 | Iwasaki et al. | 423/447.4 |
| 2003/0101866 A1 * | 6/2003 | Noack | 95/45 |
| 2003/0181315 A1 * | 9/2003 | Suzuki et al. | 502/56 |

(Continued)

FOREIGN PATENT DOCUMENTS
DE 41 04 513 A1 8/1991
(Continued)

OTHER PUBLICATIONS
International Search Report for PCT/GB2006/002926 dated Sep. 25, 2006.

(Continued)

*Primary Examiner* — Jason M Greene
(74) *Attorney, Agent, or Firm* — Nixon & Vanderhye P.C.

(57) ABSTRACT

A process for the production of a carbon membrane comprising: (i) reacting a mixture of cellulose and hemicellulose with an acid; (ii) casting the mixture to form a film, (iii) drying said film; and (iv) carbonizing said film.

17 Claims, 6 Drawing Sheets

U.S. PATENT DOCUMENTS

| | | |
|---|---|---|
| 2004/0028901 A1 | 2/2004 | Rumpf et al. |
| 2004/0187685 A1 | 9/2004 | Tatsuhara et al. |

FOREIGN PATENT DOCUMENTS

| | | |
|---|---|---|
| EP | 0 960 853 B1 | 12/1999 |
| GB | 1 118 626 | 7/1968 |
| GB | 1 346 735 | 2/1974 |
| GB | 2 207 666 A | 2/1989 |
| JP | 03060478 A | 3/1991 |
| JP | 03076821 A | 4/1991 |
| JP | 08067513 A | 3/1996 |
| JP | 09173829 A | 7/1997 |
| JP | 11001315 A | 1/1999 |
| JP | 2001009247 A | 1/2001 |
| JP | 2001353429 A | 12/2001 |
| JP | 2002355538 A | 12/2002 |
| WO | WO 98/44289 | 10/1998 |
| WO | 02/22254 | 3/2002 |
| WO | WO 02/22254 A2 | 3/2002 |

OTHER PUBLICATIONS

Lagorsse et al, "Carbon Molecular Sieve Membranes Sorption, kinetic and structural characterization", Journal of Membrane Science 241 (2004) 275-287.

Li et al, Seisan-Kenkyu, vol. 53, No. 3 (Mar. 2001).

Saufi S. M. et al.: "Fabrication of carbon membranes for gas separation—a review," Carbon, vol. 42, No. 2, pp. 241-259, 2004, XP004483335.

\* cited by examiner

CARBON MEMBRANES

This application is the U.S. national phase of International Application No. PCT/GB2006/002926 filed 4 Aug. 2006 which designated the U.S. and claims priority to GB 0516154.2 filed 5 Aug. 2005, the entire contents of each of which are hereby incorporated by reference.

This invention relates to a process for the production and subsequent regeneration of carbon membranes as well as to novel types of carbon membranes per se derived from particular pretreated precursor materials.

Scientists have been investigating ways of separating components of industrial gas streams for many years. In the petrochemical industry, the separation of paraffins from their corresponding olefins is a major research area. Ways of separating carbon dioxide from gas strews, for example, to try to reduce the impacts of global warming and ways of recovering hydrogen from gas streams, e.g. where hydrogen can be recycled, have also been widely investigated.

In general, gases such as carbon dioxide and/or hydrogen are separated from gas mixtures with, for example, methane, nitrogen and/or carbon monoxide by reversible absorption methods employing various chemical and/or physical solvents, or by reversible adsorption in beds of adsorbents (e.g. activated carbon). As conventional processes for treating carbon dioxide and hydrogen are highly energy consuming and depend on the use of additional chemicals, the cost as well as the increased demand for environmental protection enforce more efficient processes to evolve beyond the thermal age of separation processes. Membrane technology is such a non-thermal separation technique. Membrane separation also significantly reduces weight and space requirements.

Carbon membranes, also known as carbon molecular sieve membranes (CMSM), have been studied for over two decades and are known to have both high permeability of gases and high selectivity.

Saufi et al in Carbon 42 (2004) 241-259 summarise the general conditions for the fabrication of carbon membranes. They state that the formation of such membranes typically involves six stages: (1) precursor selection, (2) polymeric membrane preparation, (3) pre-treatment, (4) pyrolysis/carbonisation, (5) post-treatment, (6) module constructions.

The choice of the precursor is important since different precursors bring about different kinds of carbon membranes. Suitable precursors include thermosetting resins, graphite, coal, pitch, plants and more recently synthetic polymers such as polyamide and polyacrylonitrile. Phenolic resins and cellulose are materials which have been widely used to form into carbon membranes.

GB 2207666, for example, discloses cellulose containing membranes. U.S. Pat. No. 4,685,940 also describes carbon membranes made from regenerated cellulose.

The present inventors have surprisingly found that carbon membranes formed, from a specially treated mixture of components, namely cellulose components and hemi-cellulose components can give rise to membranes of particularly advantageous composition. The inventors have found that when such a mixture is treated with a acid such as trifluoroacetic acid it causes depolymerisation of the cellulosic components down to oligo or monosaccharides which can be formed into advantageous carbon membranes.

The inventors have also surprisingly found that such carbon membranes can be regenerated readily. Carbon membranes are known to suffer from aging effects, i.e. they show permeability and selectivity loss over time. Various regeneration techniques are known in the art. These include thermal regeneration, chemical regeneration, electrothermal regeneration, ultrasonic regeneration, or microwave regeneration.

Of these, the thermal, chemical and microwave techniques are not favoured since they are energy intensive and cannot be carried out online. Rather, the membrane needs to be regenerated whilst not performing its intended function. This down time is not economically viable on an industrial scale. Two sets of membranes could, of course, be used but this has a cost implication and still requires down time whilst membranes are switched to allow regeneration.

Moreover, thermal regeneration has the further drawback of potential carbon burn out. Chemical regeneration requires time-consuming and expensive post treatment chemical removal operations and microwave regeneration requires the use of non-membrane materials which are not affected by microwaves.

The continuous graphene sheets of the carbon membranes makes them conductive and makes electrothermal regeneration attractive. Electrothermal regeneration has the added benefit that it can be carried out on line by passing current through the membrane as the separation process continues. The carbon membranes of the invention are surprisingly able to be electrothermally regenerated in this fashion.

Thus, viewed from one aspect the invention provides a process for the production of a carbon membrane comprising:

(i) reacting a mixture of cellulose and hemicellulose with an acid;

(ii) casting the mixture to form a film, (iii) drying said film; and (iv) carbonising said film.

Viewed from another aspect, the invention provides a carbon membrane obtainable by the process as hereinbefore defined.

Viewed from another aspect, the invention provides use of a carbon membrane as hereinbefore defined in the separation of gas mixtures, e.g. in separating carbon dioxide or hydrogen from mixtures containing the same.

Viewed from another aspect, the invention provides a method for separating a gas from a gas mixture comprising said gas, e.g. in separating carbon dioxide or hydrogen from mixtures containing the same, comprising passing said gas mixture through a carbon membrane as hereinbefore defined.

Carbon membranes can typically take two forms, supported or unsupported. Unsupported membranes can be hollow fibres, flat membranes or capillary. Supported membranes (where a thin membrane is carried on a support) can be flat or tubular. The present carbon membranes can take any of these forms but are preferably hollow fibres or flat membranes carried on a support.

The first stage in the formation of the carbon membranes of the invention involves selection and pretreatment of the precursor material. In the present invention, the precursor material must comprise at least cellulose and hemicellulose components. By cellulose is meant the main polysaccharide in plants, i.e. a polymer of beta-D-glucose units linked together with elimination of water to form chains comprising, for example, 2000 to 4000 units.

Hemi-cellulose is a further type of polysaccharide found in plant cell walls which is soluble in and extractable by dilute alkaline solutions. Both these components are typically found in plants such as trees. The mixture of celluloses is conveniently provided therefore using an appropriate extract of plant pulp or plant pulp itself, especially wood pulp.

Before the precursor can be cast to form a film, it is necessary to treat the precursor material with an acid capable of hydrolysing the cellulose linkages to form oligosaccharides or monosaccharides. Trifluoroacetic acid (TFA) is of particular utility in this regard. Other acids are also of use such as sulphuric acid, nitric acid hydrochloric acid. Organic acids such as TFA may be used on their own (i.e. neat) whereas inorganic acids are preferably dilute. The acid or solution thereof preferably needs to be capable of forming a solution with the precursor material, i.e. be capable of dissolving the cellulose components.

The amount of acid employed relative to the pulp is not critical although it is preferred if the acid is in large excess. The concentration of precursor material in the acid may be of the order of 1 wt %. The exposure time of the precursor material to the acid affects the eventual performance of the membrane. Thus, the exposure time, also called hydrolysis time, and defined as the time from first dissolving the mixture in the acid until the time when the precursor film is dried, may range from 7 days to 100 days, e.g. 14 to 80 days, preferably 21 to 35 days.

It is also preferred that prior to film casting the mixture of celluloses treated with the acid has added thereto at least one metal salt. The addition of a metal salt is believed to enhance the conductivity of the membrane thus allowing better regeneration thereof.

Suitable metal salts are transition metal salts and Si salts (which shall be deemed to fall within the term metal in this case). Especially preferred metals include Ca, Mg, Fe (e.g. $Fe^{3+}$), Si, Ag and Cu. The salt may be an oxide, chloride, sulphate or nitrate, especially a nitrate. A highly preferred compound is Iron (III) nitrate.

The amount of metal salt added needs to be carefully controlled to enhance conductivity but prevent brittleness in the formed membrane. Too high metal loading results in carbon membranes that are too brittle. Hence, a trade-off between mechanical properties and electric conductivity exists. Suitable amounts relative to the weight of the mixture include 0.5 to 6 wt %, e.g. 1 to 5 wt %.

Prior to film formation, it is preferred if the components of the mixture are thoroughly mixed, e.g. by sonication. Films can then be cast using a variety of conventional techniques either in supported or unsupported form. For the manufacture of supported membranes, various options are available for coating supports with thin films. These include ultrasonic deposition, dip coating, vapour deposition, spin coating, and spray coating.

Suitable support materials are also well known and include ceramics, steel and graphite.

For unsupported membranes, typically hollow fibre membranes, conventional spinning processes are employed as described for example by A. Idris et al., Optimization of cellulose acetate hollow fiber reverse osmosis membrane production using Taguchi method, J. Membrane Sci. 205 (2002) 223-237, and by the book of M. Mulder, Basic Principles of Membrane Technology, 2nd ed., Kluwer, The Netherlands 1996. For unsupported flat membranes, the solution of acid treated cellulose and hemicellulose may be simply poured over a suitable surface, e.g. a Teflon surface.

Once formed, the film needs to be dried. This can be achieved in any conventional way, e.g. by ambient drying followed by exposure in a vacuum oven. By starting the drying process with slow drying, it is envisaged that the homogeneity of the film is improved. Drying temperatures of around 100° C. are suitable.

Most films are treated at this point, e.g. oxidised, stretched or chemically treated, prior to carbonisation. It is a further benefit of this invention that such pre-treatment is not necessary during the formation of the carbon membranes of this invention.

The carbonisation process is the most important step in the manufacture of carbon membranes. The film precursor is heated under a controlled atmosphere at a specific heating rate for a certain period. The process allows the production of carbon membranes carrying pores and causes the product to have a certain microporosity of molecular dimensions which is responsible for the molecular sieve properties of the carbon membrane.

Figure 2:
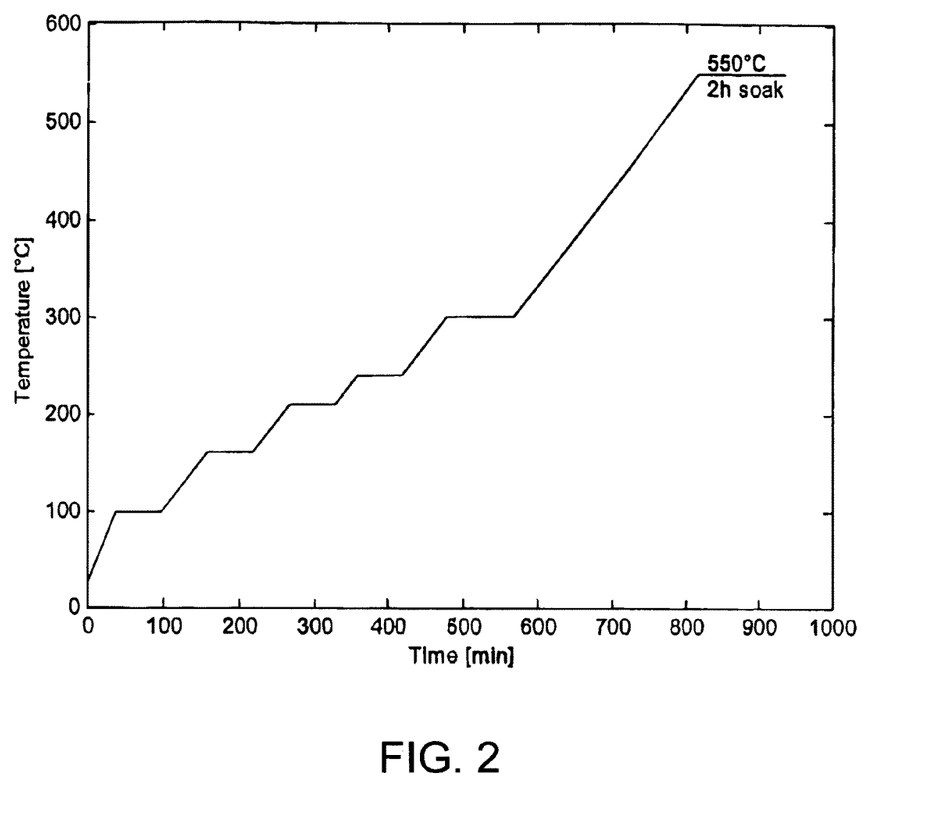
FIG. 2 shows a time vs. temperature protocol for carbonisation

In the present invention, carbonisation is preferably carried out under vacuum or under an inert atmosphere, e.g. of argon. The final carbonisation temperature may be in the range 300 to 900° C., preferably 500 to 600° C., e.g. 550° C. The heating rate may be 0.5 to 2° C. per minute, e.g. 1° C. per minute although during the heating procedure, there should be various periods of no heating where temperatures are simply maintained. These periods are called dwells. There may be several dwells, e.g. 2 to 7 dwells during the carbonisation process. These may last approximately 0.5 to 2 hours, e.g. 1 hour in duration and are preferably evenly spread throughout the heating process. FIG. 2 shows a suitable heating protocol which could be manipulated by the skilled man.

The first two dwells are believed to be important in removing residual traces of water and solvent. The carbonisation process therefore preferably comprises at least two dwells. The subsequent dwells allow the carbon matrix to rearrange and form micropores in between turbostratically arranged layers of graphene sheets. Latter dwells could be avoided if heating rates are kept low, e.g. less than 1.5° C./min.

It is conventional to use a carbonisation catalyst during the carbonisation process. A still yet further benefit of the present process is that such a catalyst is not required. Carbonisation can therefore be effected in the absence of a catalyst.

Once the final temperature is reached, the carbonisation process may continue for a further 1 to 5 hours, e.g. 2 hours at this temperature. Thereafter, the carbon membrane is allowed to cool before the furnace is purged with ambient air and the membranes removed.

Flat carbon membranes formed by this process have thicknesses in the range 1 to 100 µm, e.g. 25 to 90 µm. Pore sizes are generally in the range 0.2 to 1 nm, e.g. 0.25 to 0.6 nm and are preferably uniform in size. Membranes which take the form of hollow fibres may have thicknesses in the range 5 µm to 1 mm, with a wall thickness of from about 1 micron to 300 microns.

It is within the scope of the invention to subject the formed carbon membranes to post carbonisation treatment, perhaps to finely adjust pore dimensions and distribution or to repair defects that might exist in the membrane. Such techniques include post-oxidation, chemical vapour deposition, post-pyrolysis and coating. Saufi (supra) summarises potential post carbonisation treatments in his paper. It is an especially preferred embodiment however that the membranes produced in this invention require no such post carbonisation treatment.

As mentioned above, the carbon membranes of the invention can be electrothermally regenerated. Thus, a current can be applied across the membrane to cause regeneration. Moreover, this can be carried out whilst the membrane is in use.

The application of current across the membrane does not affect its ability to separate gas mixtures. In some situations, e.g. for the separation of carbon dioxide, permeability is actually increased. Without wishing to be limited by theory, it is envisaged that an adsorbed gas, such as carbon dioxide, may be quickly and efficiently desorbed from the membrane by the passage of a direct current. The van der Waals forces between the carbon skeleton and the carbon dioxide are disrupted or perhaps reversed by the electric current. As a result, adsorbed carbon dioxide is released or repulsed from the micropore surface and desorption occurs. The same effect may apply to other adsorbed gases.

The current applied across the membrane can vary but must not be so high as to cause burning in the membrane. A 1 to 60 mA, preferably 20 to 40 mA, e.g. 30 mA current is appropriate although this may vary depending on the size of the carbon membrane. The inventors have found also that the regeneration process can be carried out not only periodically but also continuously to maximise gas separation.

Thus viewed from a further aspect the invention provides a process for the separation of a gas from a gas mixture comprising said gas, said process comprising passing said gas mixture through a carbon membrane as hereinbefore defined, said membrane being periodically or continuously regenerated by passage of direct current therethrough.

Gases which can be separated from gas mixtures using the membranes of the invention include carbon dioxide and hydrogen. Preferred separated combinations include hydrogen/methane, hydrogen from natural gas, carbon dioxide from biogas or natural gas, separation of any component hydrogen/carbon dioxide/methane/carbon monoxide from coal gasification or steam reforming of hydrocarbons. The membranes separate gases by being selectively more permeable to certain gases than others as shown in the examples which follow.

The way in which the membrane is installed in a suitable device or module may affect the membrane performance. The person skilled in the art can tailor modules to suit his needs. Thus, it may be possible to use a series of carbon membranes made by the above process having different pore sizes.

The invention will now be further described with reference to the following non-limiting examples and figures.

BRIEF DESCRIPTION OF THE FIGURES

FIG. 1 shows an experimental set-up for carbonisation. The precursor membrane (not shown) is placed inside alumina tube (1) sealed by stainless steel end caps (2). Heating is effected using tubular furnace (3). The carbonisation reaction takes place in a vacuum so tube (1) is connected via flexitubing (4) via a diaphragm valve (5) to a vacuum pump (6). The cold trap (7) condenses any vapours emitted during the carbonisation process and any particulate material is collected in particle filter (8). Pressure transmitter (9) measures the pressure in the system.

FIG. 5 shows an experimental set-up for membrane test cell and electrothermal regeneration. Carbon membrane (10) is held in place using aluminium tape (12) and an epoxy resin (13). Conductive glue (14) allows single core cables (15) to be connected to opposite sides of the membrane. The O-ring (11) sits in a circular disc (16) which can be bolted to a carrier through holes (17). Power is supplied from supply (18).

FIG. 6 shows the effect of electric current on $CO_2$ permeability. Relative $CO_2$ flux with and without current as a function of $CO_2$ exposure time is depicted. Each permeation test was run for 7 hours at 30° C. and 2 bar feed pressure. The carbons were degenerated by static exposure in 1 atm $CO_2$ at 30° C.

EXAMPLE 1

Film Formation

The pulp (a mixture of cellulose and hemicellulose) was dissolved in trifluoroacetic acid (TFA) to a concentration of about 1 wt %. Hydrolysis times were 6 days, 14 days or 74 days.

The solution was stirred overnight and then ultrasonicated with a VibraCell 130 (Sonics & Materials, Inc., CT, USA) 6 mm rod for 2 minutes at amplitude 80 microns.

A film was cast on a Teflon™ dish at room temperature. The film was covered to protect it from dust and to saturate the atmosphere above the film surface in order to slow down the evaporation rate, thereby increasing the homogeneity of the resulting film. The cast film precursor was left at room temperature and after 4 days finally dried in a vacuum oven at 105° C. for about 18 hours.

EXAMPLE 2

Carbonisation Procedure

Figure 1:
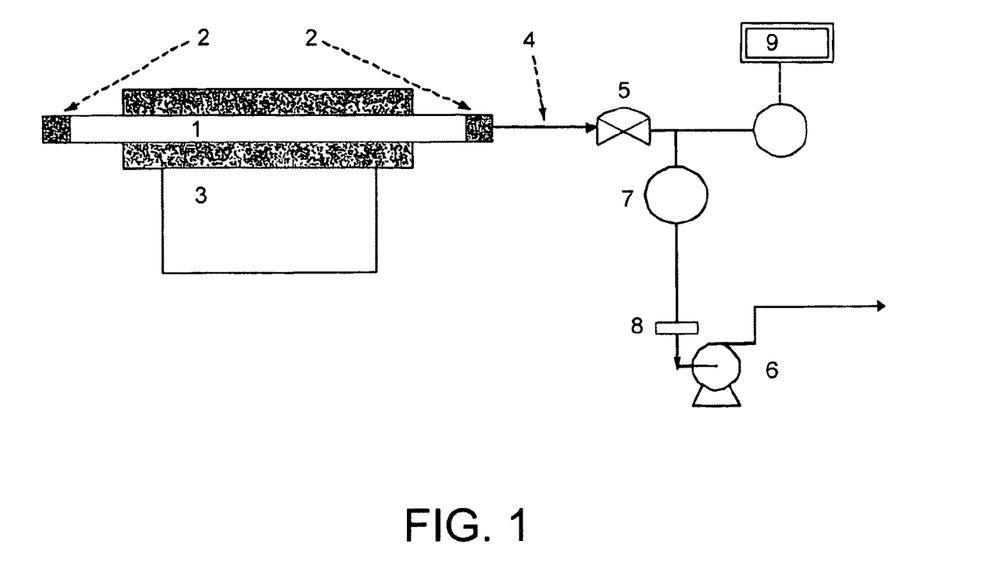

Films were carbonised under vacuum in a tubular furnace (Carbolite® TZF 12/100/900), using a working tube of alumina and a stainless steel grid as support for the films. The set-up is given in FIG. 1.

The basic protocol had a final temperature of 550° C., kept for 2 hours, a heating rate of 1° C./min and several dwells. The protocol is pictured in FIG. 2. After the final temperature was reached the system was allowed to cool naturally to a temperature less than 50° C., before the furnace was purged with ambient air and the films removed.

EXAMPLE 3

Permeation Testing

The circular carbon films were masked using an impermeable aluminium tape, leaving open a defined permeation area. Epoxy was then applied along the interface of the tape and the carbon. A sintered metal disc covered with a filter paper was used as support for the film in the test cell. Single gases were tested at 30° C. and a feed pressure of 2 bar (permeate side evacuated) in a standard pressure-rise set-up (MKS Baratron® pressure transducer, 0-100 mbar range) with LabView® data logging. The experimental method and set up is described in K. C. O'Brien, W. J. Koros, T. A. Barbari and E. S. Sanders, A new technique for the measurement of multicomponent gas transport through polymeric films, J. Membrane Sci., 29 (1986) 229-238 and M. R. Coleman, Isomers of fluorine-containing polyimides for gas separation membranes, PhD thesis, Univ. of Texas at Austin Tex., USA, 1989.

The order of testing was always nitrogen, hydrogen, methane, oxygen, carbon dioxide, $SF_6$, and finally nitrogen again to measure any degree of aging (productivity loss). This test order prevents the strongly adsorbing gases from disturbing the performance of the more ideal or non-interacting gases in carbon. The tests were run for several hours or days, to ensure that the transient phase of diffusion was passed. The permeation system was evacuated overnight in between each gas test.

It may also be speculated that smaller fragments move more easily around than do longer chains thus forming the aromatic, turbostratic structure of carbon (analogous with carbon mesophase for graphitizable carbons). The longer chains are less mobile and may have more difficulties in rearranging themselves before the carbon phase is formed.

EXAMPLE 5

Figure 3:
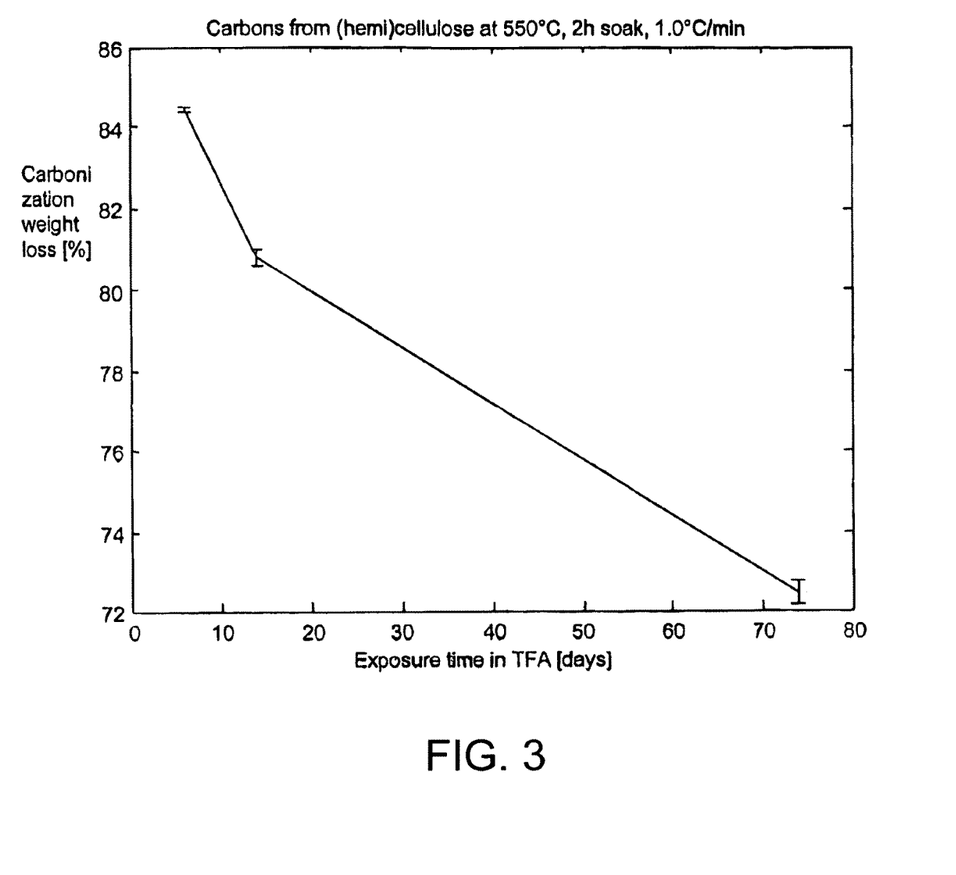
FIG. 3 shows weight loss for pure pulp (550° C., 2 h soak) as a function of TFA exposure time. Error bars have a length 2 times the standard deviation for each carbonisation batch.

Examples 1 to 3 were repeated using pulp(a mixture of cellulose and hemicellulose) as the starting material and with varying hydrolysis times. The hemicellulose weight loss results obtained are plotted in FIG. 3.

EXAMPLE 6

Permeation Results

Figure 4:
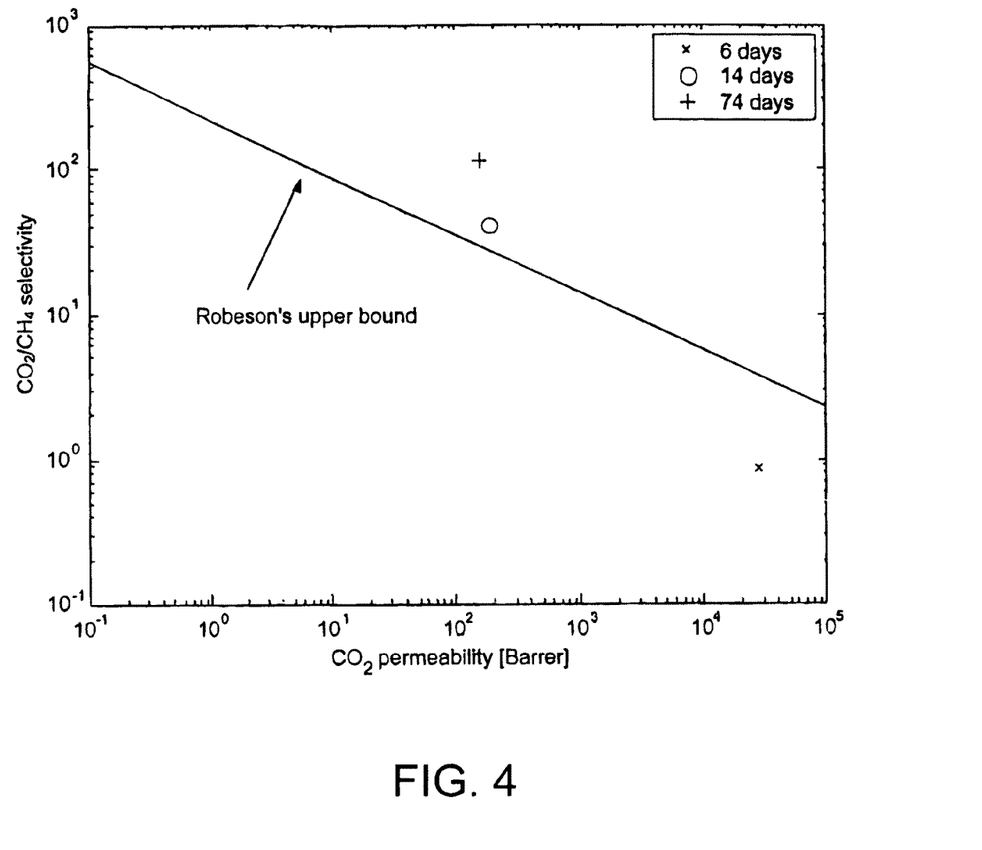
FIG. 4 shows separation performance for carbons (550° C., 2 h soak) from different precursor exposure times in TFA (single gases at 30° C., 2 bar)

Permeation test results for several gases using the membranes of Example 5 are given in table 2 and FIG. 4 for $CO_2/CH_4$.

TABLE 2

Results for carbons (550° C., 2 h soak) from pure pulp exposed to TFA for 6, 14 and 74 days, respectively.

| Film | Thickness [micron] ± 2SD | $P_{N2}$ [Barrer] | $P_{H2}$ [Barrer] | $P_{CH4}$ [Barrer] | $P_{O2}$ [Barrer] | $P_{CO2}$ [Barrer] | $P_{SF6}$ [Barrer] | Aging [% change in $N_2$ permeability] |
|---|---|---|---|---|---|---|---|---|
| C-6 | 86 ± 7 | $29 \times 10^3$ | $55 \times 10^3$ | $32 \times 10^3$ | $17 \times 10^3$ | $28 \times 10^3$ | $21 \times 10^3$ | −18 |
| C-14 | 40 ± 4 | 4.2 | $9.4 \times 10^2$ | 4.6 | 54 | $1.9 \times 10^2$ | 0.63 | +14 |
| C-74 | 46 ± 9 | 5.7 | $8.6 \times 10^2$ | 1.3 | 48 | $1.5 \times 10^2$ | — | −24 |

(For conversion of Barrer to kmol × m × m − 2 × s − 1 × kPa − 1, divide by $2.99 \times 10^{15}$.)

EXAMPLE 4

Effect of Hydrolysis Time on Performance of Carbons from Pulp Without Metal Additives

TABLE 1

Descriptions of carbons from pure pulp exposed to TFA for different times (carbonized at 550° C., 2 h soak).

| Sample ID | Hydrolysis time [days] | Precursor* appearance | Carbon# appearance | Weight loss of carbon batch [%] | Diameter shrinkage [%] |
|---|---|---|---|---|---|
| C-6 | 6 | Flexible, rough | Black/grey, dull, rough | 84.4-84.5 | 42-46 |
| C-14 | 14 | Black, brittle, smooth | Black, shiny, smooth | 80.6-81.2 | — |
| C-74 | 74 | Black, brittle, smooth | Black, shiny, smooth | 71.9-72.6 | 31 |

*pre carbonisation,
post carbonisation
(Weight loss of carbon batch is the loss of weight relative to the weight of the precursor film. Diameter shrinkage relates diameter pre to post carbonisation).

Depolymerization and furan formation may explain the increased carbon yield when increasing the TFA exposure time in table 1. Furans are particularly thermally stable because of their aromatic nature. Furans are also more volatile than levoglucosan, a known major carbonization intermediate from cellulose, hence capable of surviving high temperatures.

TFA exposure for only 6 days resulted in films showing Knudsen diffusion (see e.g. O2 and N2) and surface diffusion (see e.g. CO2 and SF6). After 2 weeks a critical threshold in the hydrolysis process has been reached, and the CO2/CH4 separation performance seems to increase with time. Variation in exposure time between 14 and 74 days has minor influence on permeability, according to FIG. 4.

The results indicate that furans are a key intermediate in forming microporosity with high separation performance. The best separation performance (best combination of permeability and selectivity) is obtained for the longest hydrolysis time (FIG. 4). The conversion to furans increases with increasing hydrolysis time. It is favourable that this intermediate is also formed prior to carbonization through acid treatment, and not only during the carbonization process.

EXAMPLE 7

Regeneration

Examples 1 to 3 were repeated using wood pulp as starting material and 14 day TFA treatment. Iron (III) nitrate (FeN) was added in various concentrations to the TFA/pulp solution. The metal content was 1.8 wt % for one batch and 4.4 wt % for another batch.

Figure 5:
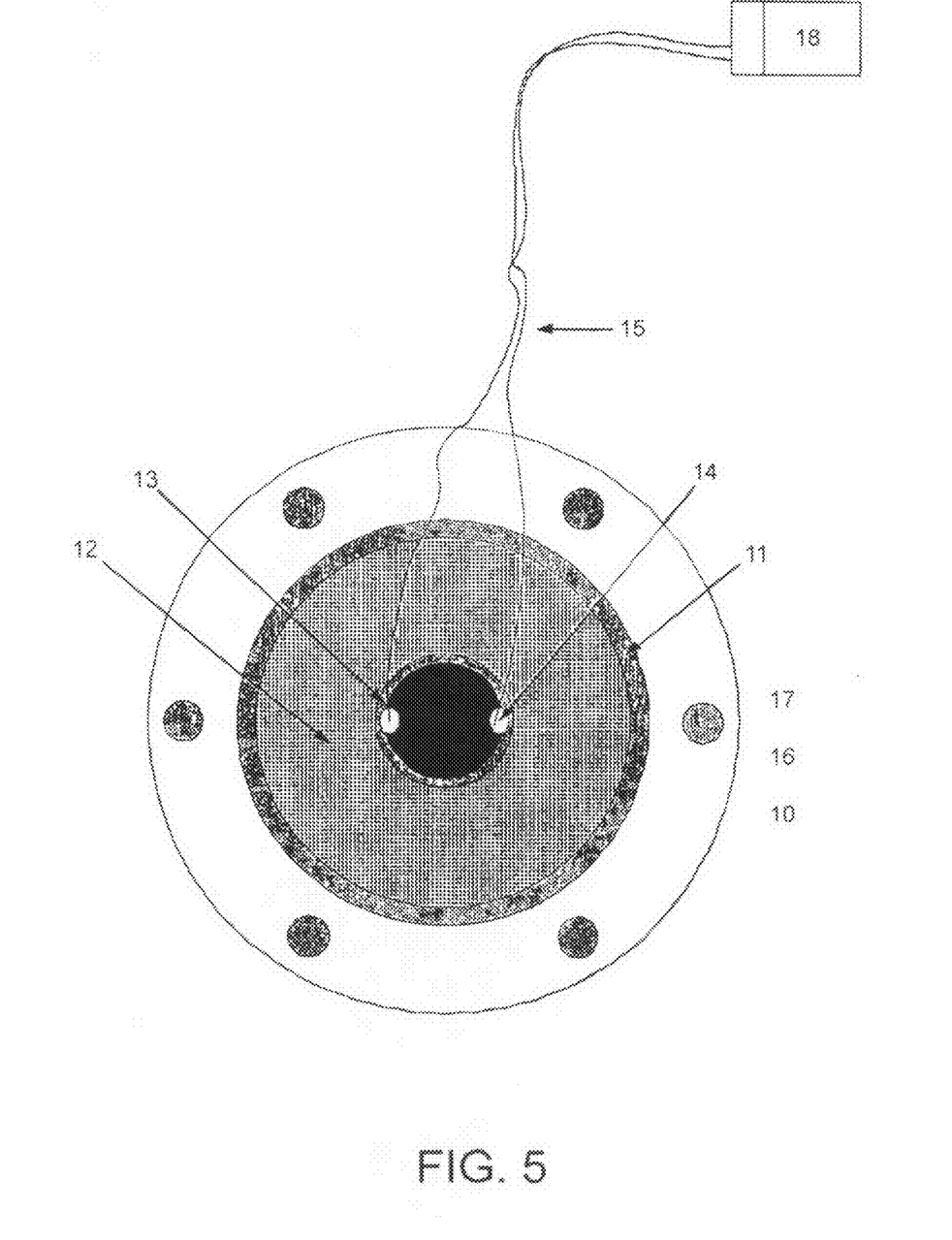

Electrothermal regeneration was used. Soldering was tested as a way of attaching single-core cables to the membrane. A soldering paste was used to increase the wettability of the tin solder on carbon, but poor adhesion remained a problem. Hence, a 2-component conductive epoxy was used. An increasing current density was applied on a test membrane (not masked), and 30 mA (17.5V DC) was found to be a current density that the carbon could withstand for several hours at room temperature. A 100 mA current caused burning of the carbon. A carbon membrane was then masked. After the ordinary epoxy had dried, and the membrane was found to function, the single-core cables were connected with conductive glue at opposite regions at the membrane feed side and then cured (FIG. 5).

Each of the permeation tests with applied current lasted for 7 hours, with a constant direct current of 30 mA. The membrane was evacuated overnight in between each gas test. To evaluate the effect of electric current, a non-wired carbon from the same batch was also permeation tested (7 hours per day). The carbons were degenerated by static exposure in 1 atm $CO_2$ at 30° C. An experimental series was designed to give the two membranes a similar history.

Membrane data and single gas permeabilities are given in table 3.

TABLE 3

Results from carbonization (550° C., 2 h soak) of metal nitrate containing wood pulp (single gases, 2 bara at feed side, 30° C.).

| Film | Weight-loss [%] ± 2SD | Thickness [micron] ± 2SD | $P_{H2}$ [Barrer] | $P_{CH4}$ [Barrer] | $P_{CO2}$ [Barrer] | $P_{O2}$ [Barrer] | $P_{N2}$ [Barrer] |
|---|---|---|---|---|---|---|---|
| C—FeN 1.8 | 69.0 ± 0.8 | 74.8 ± 7.7 | $10 \times 10^2$ | 2.1 | $3.1 \times 10^2$ | 86 | 8.2 |
| C—FeN 4.4 | 82.85 ± 0.04 | 63.8 ± 5.7 | — | 29 | $4.2 \times 10^2$ | — | 37 |

For conversion of Barrer to kmol × m × m − 2 × s − 1 × kPa − 1, divide by $2.99 \times 10^{15}$.

EXAMPLE 8

Degeneration and Regeneration

Carbons with 4.4 wt % FeN were chosen for degeneration and regeneration experiments, because of their higher conductivity. Table 4 gives some key results for the wired and non-wired carbon.

TABLE 4

Performance summary of wired and non-wired carbon (single gases at 30° C. and 2 bar).

| Property | Wired carbon Current on/off | Non-wired carbon |
|---|---|---|
| Start permeability [Barrer]: | | |
| $N_2$ | 36.9 Off | 36.9* |
| $CH_4$ | 28.7 Off | 28.7* |
| $CO_2$ | 420 Off | 420* |
| Change in $CO_2$ flux during permeation tests (%) | +56 On | +8.3 |
| Change in $CH_4$ flux during permeation tests (%) | −10 On | −58 |
| Change in $CO_2$ flux during aging in 1 atm $CO_2$ (%) | +6.1 On | −62 |
| End permeability [Barrer]: | | |
| $N_2$ | 24.7 Off | 6.5 |
| $CH_4$ | 17.7 Off | 3.4 |
| $CO_2$ | 393 Off | 172 |
| Overall change in $CO_2$ flux (%) | +65 On | −59 |
| Overall change in $CH_4$ flux (%) | −0.2 On | −88 |

*assumed similar to the wired membrane

Application of electric current increases the overall $CO_2$ permeability by 65%, while the overall $CH_4$ permeability is unchanged. For the non-wired carbon the $CO_2$ permeability is more than halved.

Figure 6:
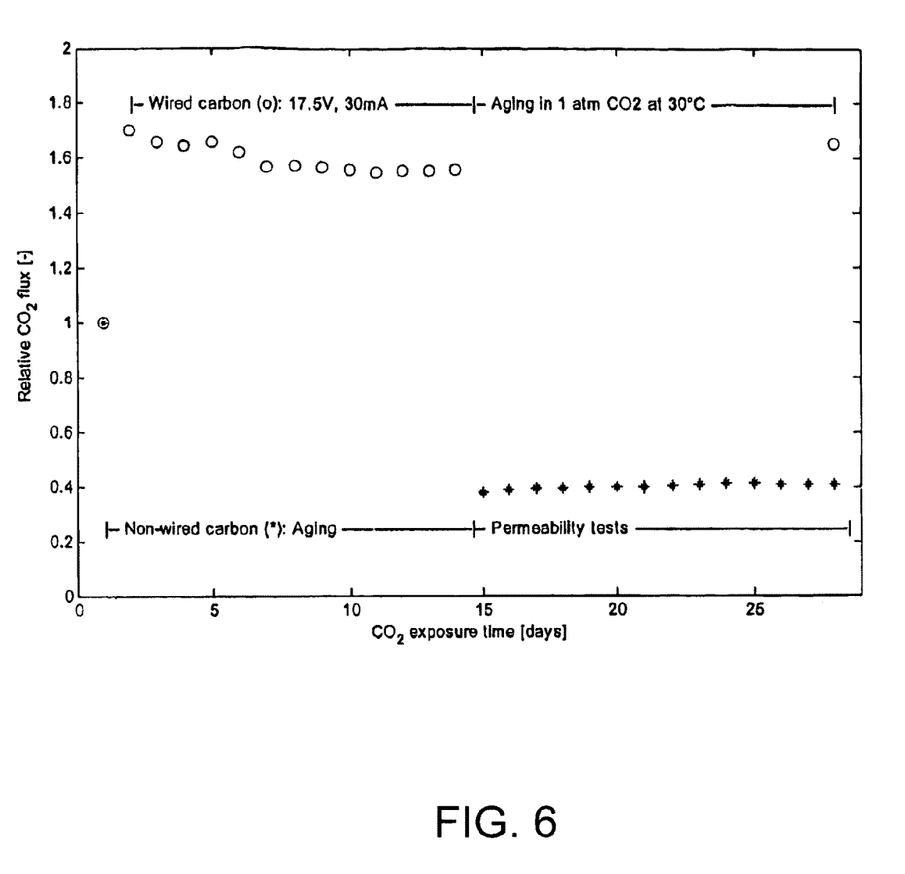

FIG. 6 shows the results of aging and regeneration experiments. Since the carbons are from the same carbonization batch, it is assumed that the starting permeability of the non-wired carbon was the same as for the wired carbon. The results indicate a significant effect of the applied electric current. Electric current can be used not only as a periodic regeneration method, but also in a continuous way, facilitating the transport of $CO_2$, but blocking $CH_4$.

The invention claimed is:

1. A process for the production of a carbon membrane comprising:
   (i) reacting a mixture of cellulose and hemicellulose with sufficient acid to hydrolyze the cellulose linkages to form oligosaccharides or monosaccharides;
   (ii) casting the mixture to form a film,
   (iii) drying said film; and
   (iv) carbonising said film.

2. A process as claimed in claim 1 wherein said acid is trifluoroacetic acid.

3. A process as claimed in claim 1 wherein a metal salt is added to the mixture of step (i).

4. A process as claimed in claim 3 wherein said metal salt forms 0.5 to 6 wt % of said mixture.

5. A process as claimed in claim 3 wherein said metal salt is iron (III) nitrate.

6. A process as claimed in claim 1 wherein the mixture of cellulose and hemicellulose is provided using wood pulp.

7. A process as claimed in claim 1 wherein steps (i) to (iii) take 7 to 100 days.

8. A process as claimed in claim 7 wherein steps (i) to (iii) take 21 to 35 days.

9. A process as claimed in claim 1 wherein the final carbonisation temperature is 500 to 600° C.

10. A process as claimed in claim 1 wherein the carbonisation step (iv) comprises at least two dwells.

11. A process as claimed in claim 1 wherein step (iv) is effected in the absence of a catalyst.

12. A process as claimed in claim 1 further comprising a regeneration step (v) in which a current is applied across the carbon membrane.

13. A process as claimed in claim 10 wherein said current is 1 to 60 mA.

14. A carbon membrane obtainable by the process of claim 1.

15. A process for the separation of a gas from a gas mixture comprising said gas, said process comprising passing said gas mixture through a carbon membrane of claim 14.

16. A process as claimed in claim 15 wherein said membrane is periodically or continuously regenerated by passage of direct current therethrough.

17. A process as claimed in claim 15 wherein the gas being separated is carbon dioxide or hydrogen.

* * * * *